United States Patent [19]

Harris, Jr.

[11] Patent Number: 4,912,895
[45] Date of Patent: Apr. 3, 1990

[54] ADJUSTABLE SPACER

[75] Inventor: Charles F. Harris, Jr., Ypsilanti, Mich.

[73] Assignee: Ford Motor Company, Dearborn, Mich.

[21] Appl. No.: 138,105

[22] Filed: Dec. 28, 1987

[51] Int. Cl.[4] .............................. B60J 1/02; B60J 1/18
[52] U.S. Cl. ........................................ 52/208; 52/397; 296/201; 296/96.21
[58] Field of Search ................. 52/208, 214, 217, 770, 52/773, 397, 401, 126.1, 398–403, 713; 296/84 A, 84 D, 201; 24/543, 487

[56] References Cited

U.S. PATENT DOCUMENTS

| | | | |
|---|---|---|---|
| 3,149,386 | 9/1964 | Trundy | 24/157 |
| 3,714,738 | 2/1973 | Koslow et al. | 49/404 |
| 4,074,501 | 2/1978 | Sandqvist | 52/741 |
| 4,135,335 | 1/1979 | Jensen | 52/126.1 |
| 4,168,858 | 9/1979 | Inamoto | 296/84 R |
| 4,172,000 | 10/1979 | Horike et al. | 156/108 |
| 4,249,356 | 2/1981 | Noso | 52/717 |
| 4,361,997 | 12/1982 | DeCaro | 52/512 |
| 4,378,617 | 4/1983 | Burns | 24/336 |
| 4,380,413 | 4/1983 | Dewey | 411/161 |
| 4,455,804 | 6/1984 | Francovitch | 52/698 |
| 4,467,581 | 8/1984 | Francovitch | 52/410 |
| 4,476,660 | 10/1984 | Francovitch | 52/515 |
| 4,520,606 | 6/1985 | Francovitch | 52/410 |
| 4,536,924 | 8/1985 | Willoughby | 24/487 |
| 4,545,270 | 10/1985 | Dewey | 81/429 |
| 4,561,689 | 12/1985 | Sprenger | 296/84 A |
| 4,586,301 | 5/1986 | Hickman | 52/96 |
| 4,616,455 | 10/1986 | Hewison | 52/127 |
| 4,617,771 | 10/1986 | Tomaszewski | 52/410 |
| 4,620,402 | 11/1986 | Beneze | 52/410 |
| 4,624,092 | 11/1986 | Boginski | 52/713 |
| 4,649,868 | 3/1987 | Backenstow et al. | 52/509 |
| 4,651,490 | 3/1987 | Marston | 52/410 |
| 4,658,558 | 4/1987 | Verble | 52/410 |
| 4,659,138 | 4/1987 | Gösse et al. | 296/201 |
| 4,663,910 | 5/1987 | Hasan | 52/410 |
| 4,679,366 | 7/1987 | Hitchins | 52/217 |
| 4,712,341 | 12/1987 | Harris, Jr. et al. | 52/208 |
| 4,712,959 | 12/1987 | Hasan | 411/533 |
| 4,726,164 | 2/1988 | Reinwall et al. | 52/410 |
| 4,727,699 | 3/1988 | Sargent | 52/410 |
| 4,731,965 | 3/1988 | Jensen | 52/126.1 |
| 4,744,187 | 5/1988 | Tripp | 52/410 |
| 4,757,661 | 7/1988 | Hasan | 52/410 |
| 4,757,662 | 7/1988 | Gasser | 52/410 |
| 4,763,456 | 8/1988 | Giannuzzi | 52/410 |
| 4,780,039 | 10/1988 | Hartman | 411/531 |
| 4,787,188 | 11/1988 | Murphy | 52/410 |

FOREIGN PATENT DOCUMENTS 3543815 6/1987 Fed. Rep. of Germany ... 296/84 A

Primary Examiner—Michael Safavi
Attorney, Agent, or Firm—Daniel M. Stock; Clifford L. Sadler

[57] ABSTRACT

An adjustable spacer for accurately positioning non-movable windows of an automotive vehicle within apertures formed in the vehicle bodies is provided which consists of a mounting member, an adjusting member molded together as a single unit joined by a strap, and engageable with each other in snap-fit relationship to a position where they are movable with respect to each other in a wedge-like action adjustably positioned by means of sets of ratchet teeth formed between them.

4 Claims, 3 Drawing Sheets

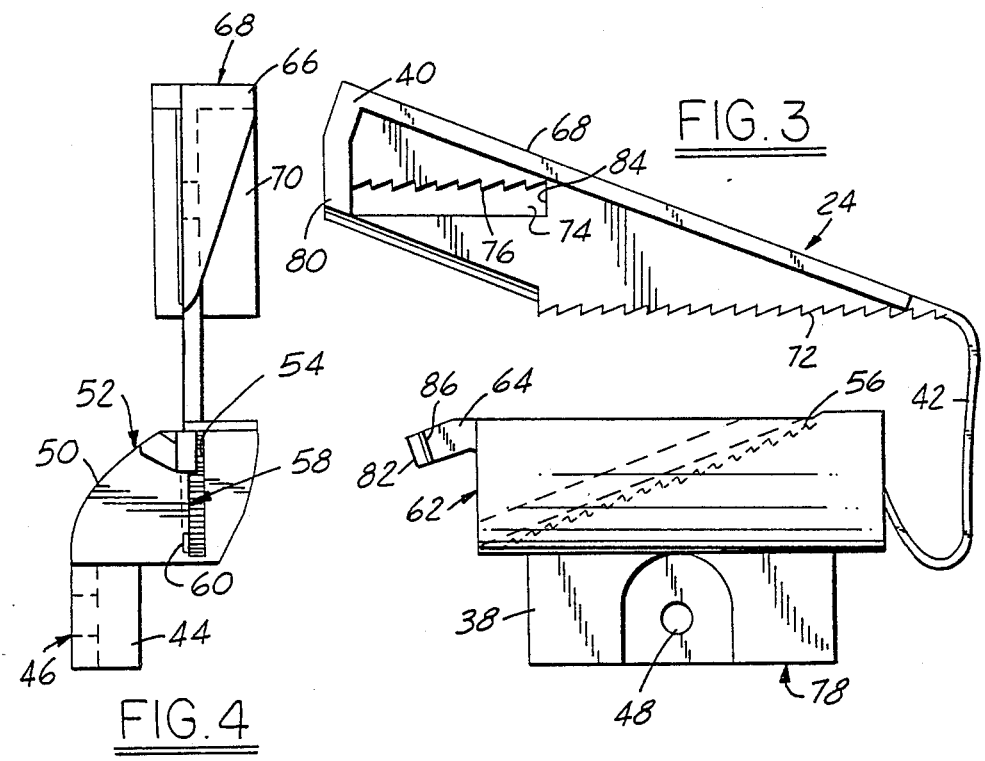
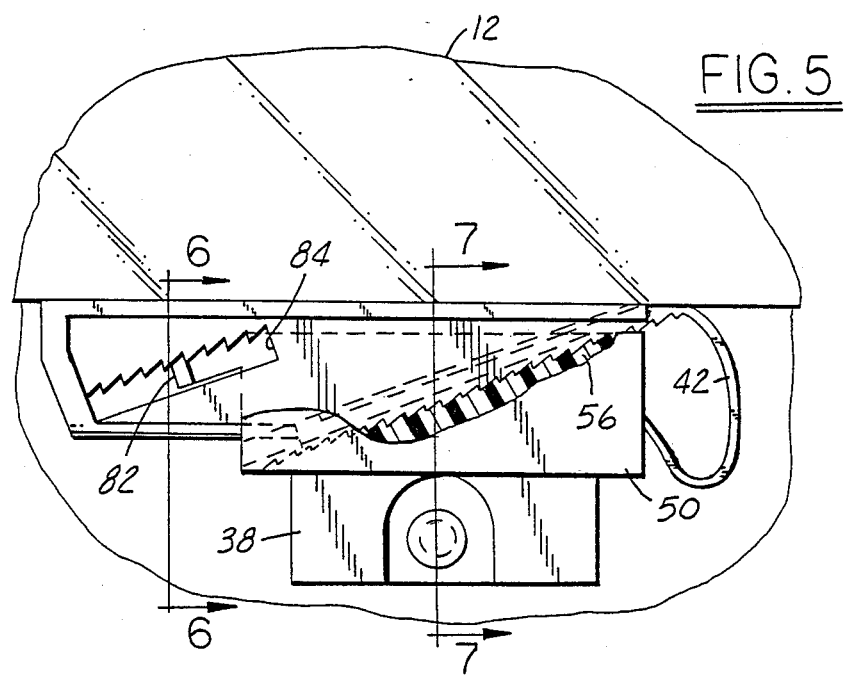

ADJUSTABLE SPACER

BACKGROUND OF THE INVENTION

The present invention relates generally to the assembly of non-movable windows into automotive vehicle bodies and more specifically to the construction of spacers for accurately positioning the windows within apertures formed in the body.

DESCRIPTION OF THE PRIOR ART

In the installation of non-movable windows in portions of the bodies of automotive vehicles, it has often been found necessary to provide adjustable positioning elements to properly fix the position of the window to yield the desired peripheral clearance between the window and the adjacent portions of the vehicle body. One way in which this has been accomplished is disclosed in U.S. Pat. No. 4,659,138 to Gosse et al in which a threaded fastener is used to adjustably move a glass engaging element. Another approach is that exemplified in U.S. Pat. No. 4,561,689 to Sprenger in which a rotatable eccentric cam element is used to adjustably engage an edge of the glass. The wedge has also been used as a window position adjusting mechanism as exemplified in U.S. Pat. No. 3,714,738 to Koslow et al in a non-automotive environment. Wedges, of course, can be secured in position in ratcheting fashion, as suggested by U.S. Pat. No. 4,135,335 to Jensen, also a disclosure in an unrelated environment.

Rotatively actuated adjusting devices, such as Gosse and Sprenger, have been found disadvantageous in that they require the use, handling, maintenance and inventory of a multiplicity of parts. Design compromises are also necessary to assure access to the input to the rotary adjusting device. Simple wedges, on the other hand, are disadvantageous in that at least one of the wedge parts cannot be fixed to a rigid portion of the vehicle, either the glass or the vehicle body, since relative movement between glass and body in the directing creating the wedging action cannot be accommodated in assembling a vehicle. They are further disadvantageous in that the handling of the two separate wedge parts must be accommodated separately to avoid loss of parts during assembly.

SUMMARY OF THE INVENTION

It is accordingly an object of the present invention to provide a simple economical adjustable positioning device for effecting the positioning of nonmovable automotive windows with respect to automotive vehicle bodies.

It is another object of the present invention to provide such a positioning device which provides for wedging adjustment while maintaining two wedge parts as a single unit.

It is yet another object of the present invention to provide such a positioning device in which the wedge portions are configured to resist separation through movement, both parallel to the wedging movement and normal thereto.

According to a feature of the present invention, an adjustable spacer is provided achieving these objects through the provision of a unitary plastic molded part having two major wedge portions joined together by a connector resilient strap.

According to another feature, abutment means are provided to resist separation of the major portions of the spacer through movement in the wedging direction.

According to yet another feature of the present invention, the two major wedge member sections of the adjustable spacer are received together in snap-fit relationship through insertion of one into the other in the direction normal to the plane of wedging movement of the wedge portions.

BRIEF DESCRIPTION OF THE DRAWINGS

These and other objects and features will become apparent to those skilled in the automotive assembly arts upon reading the following description with reference to the accompanying drawing in which:

FIG. 3 is a front view of the adjustable spacer of the present invention;

FIG. 4 is a left side view of the spacer of FIG. 3;

FIG. 5 is an enlarged partial frontal view of the adjustable spacer of the present invention installed at the lower edge of the vehicle rear window;

DESCRIPTION OF THE PREFERRED EMBODIMENT

Figure 1:
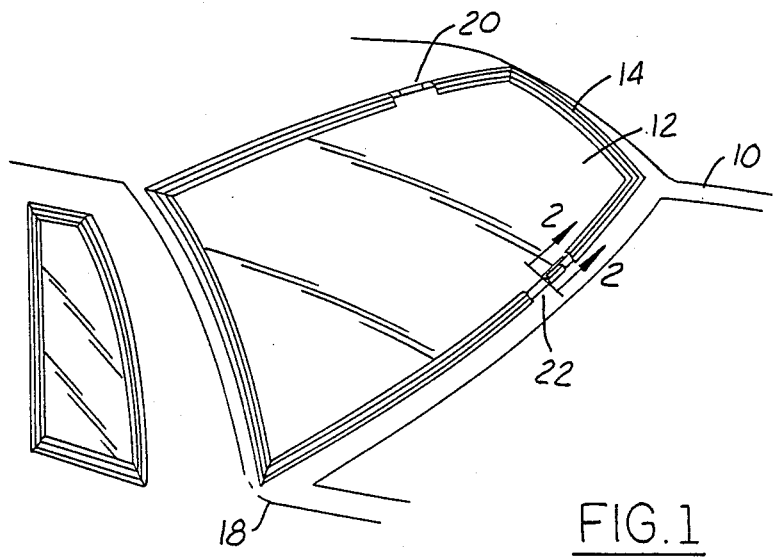
FIG. 1 is a rear perspective view of an automobile illustrating its rear window adjustably positioned according to the present invention.

An automobile 10 is illustrated as having a non-movable rear window 12, surrounded by a decorative molding 14, carried in an aperture 16 formed in its body 18. Adjustable spacers according to the present invention are operatively connected between the body 18 and the window 12 at opposed edges of the window, such as the top and bottom locations 20, 22 illustrated in FIG. 1.

Figure 2:
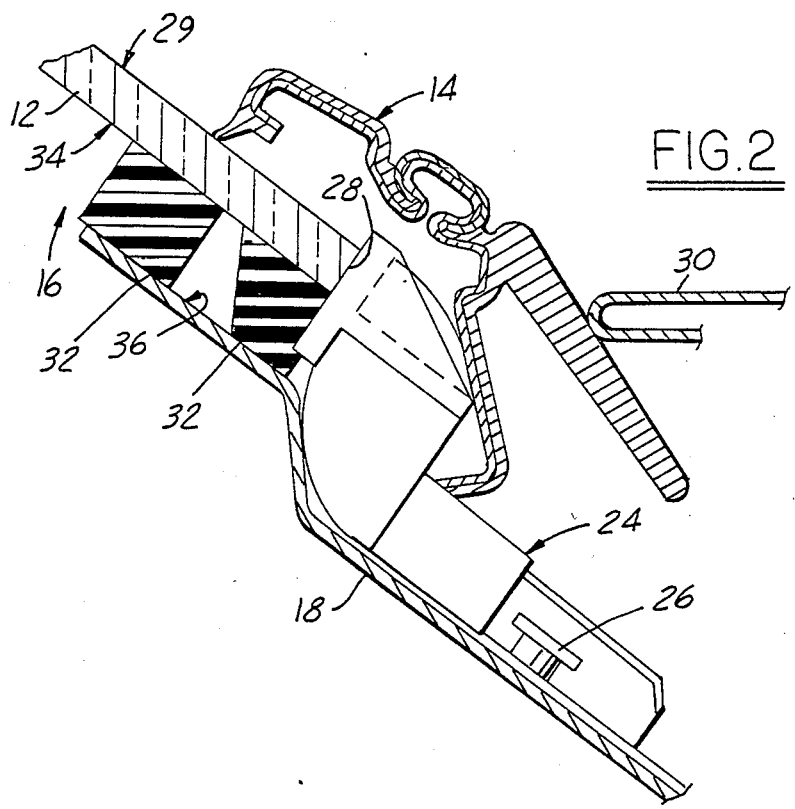
FIG. 2 is a cross-sectional view taken along line II—II of FIG. 1 showing the assembly of an adjustable spacer according to the present invention along the bottom edge of the vehicle window.

It is illustrated in FIG. 2 that an adjustable spacer 24 is fixedly secured to the body 18 as by a rivet 26 and abuttingly engages a lower edge 28 of the window 12. The decorative molding 14 extends between the outer surface 29 of the window 12 and an outer surface 30 of the vehicle body 18 to provide a decorative edging for the glass of the window 12 at its peripheral interface with the body 18. The window 12 is fixedly secured to the body 18 by the application of suitable adhesives 32 between the inner surface 34 of the window 12 and an outer surface 36 of the body 18. These adhesives 32 are applied at the manufacturing plant at which the vehicle 10 is assembled and during the hardening of the adhesives 32, the adjustable spacer 24 may be operated to position the lower edge 28 of the window 12 as desired. As the description progresses, it will be appreciated that while the construction and use of the adjustable spacer 24 is described in the environment in which it is positioned adjacent the lower bottom surfaces 22 of the window 12, identical adjusting spacers may be positioned at the top 20 and the side surfaces of the window 12.

As can best be seen in FIG. 3, the adjustable spacer 24 comprises a mounting member 38 and an adjusting member 40, each formed as wedge-like members and preferably molded as a unitary plastic part in which the mounting member 38 and the adjustable member 40 are joined by a strap member 42.

The mounting member 38 includes a base 44, illustrated as having a flat mounting surface 46 for abuttingly engaging a portion of the vehicle body 18. The mounting member 38 is pierced by an aperture 48 for receiving the rivet 26 through which the mounting member 38 is secured to the vehicle body 18. Adjacent the base 44 is a ratchet block 50 which may include a curved molding mounting surface 52 for tangentially supporting a portion of the decorative molding 14. The ratchet block 50 has a channel 54 having a set of diagonally extending ratchet teeth 56 formed in its base as may best be seen in FIGS. 3 and 4. The channel 54 is offset from and is defined in a plane parallel to the mounting surface 46 of base 44. One wall 58 of the channel has formed therein a recess 60 extending in parallel fashion along the wall 58 parallel to the ratchet teeth 56. At one end 62 of the ratchet block 50, a pawl 64 extends in a direction parallel to the channel 54.

The adjusting member 40 has a mounting portion 66 having a flat upper surface 68 for abutting engagement with the lower edge 28 of the window 12. It also has a ratchet portion 70 depending from the mounting portion 66. At an outer edge of the ratchet portion 70, a set of ratchet teeth 72 are formed to lockingly engage the teeth 56 of ratchet block 50. A window 74 is formed through the ratchet portion 70 and at an upper edge of the window 74 a second set of ratchet teeth 76 is formed. Both sets of ratchet teeth 72, 76 are formed at an angle with respect to the mounting surface 68, such that engagement of the teeth 72, 76 positions the mounting surface 68 in a desired angular relationship with respect to the vehicle body 18 as may be defined by engagement of a bottom surface 78 of mounting portion 44 with the cooperating portion of the vehicle body 18. In the embodiment illustrated, this would position the mounting surface 68 essentially horizontally.

Figure 6:
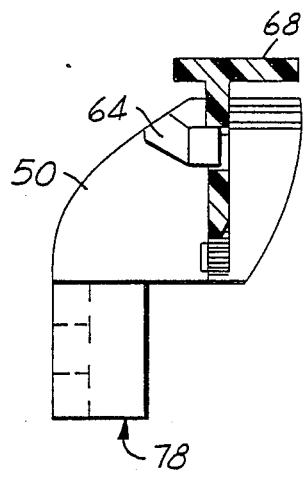
FIG. 6 is a cross-sectional view taken along line 6—6 of FIG. 5.
Figure 7:
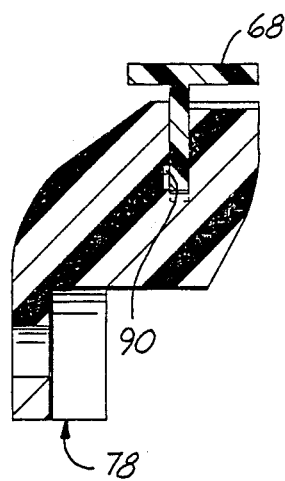
FIG. 7 is a cross-sectional view taken along line 7—7 of FIG. 5.

It will be noted that the pawl 64 is engagable with the teeth 76 in ratcheting fashion along a path parallel to that defined by the engagement of teeth 56, 72 to stabilize and limit the relative movement between the mounting member 38 and the adjusting member 40. Ratcheting travel is limited by engagement of the pawl 64 in the window 74 by provision of a wall 80 at one end of the window 74 for abuttingly engaging an outer end surface 82 of the pawl 64 and an end wall 84 at the other end of the window 74 for abuttingly engaging an inner surface 86 of the pawl 64. The pawl 64 is formed as a hook-like member, as may best be seen in FIG. 6 having a bent-over portion 88 which is inserted into the window 74. As may best be seen in FIG. 7, a projection 90 is formed on ratchet portion 70 extending perpendicularly therefrom for snap-fit engagement in the recess 60 of ratchet block 50.

The assembly and operation of the adjustable spacer 24 may be readily understood by reference to FIGS. 3 and 5. Since the spacer 24 is formed as a unitary part in which the mounting member 38 and the adjusting member 40 are joined by the strap 42, efficient manufacturing of the vehicle 10 is enhanced by the joining of the three operative elements. Engagement of the ratchet teeth 56, 72 and the pawl 62 and ratchet teeth 76 to the position of FIG. 5 can be accomplished without separating the parts as by breaking the strap 42 since the ratchet portion 70 of the adjusting member 40 is inserted into the channel 54 with snap-fit engagement between the projection 90 and the recess 60. Moving the adjusting spacer rightwardly as viewed in FIG. 5 increases the vertical separation between the window mounting surface 68 and the mounting member 38. Adjusting travel is limited in the raising direction by interaction of the pawl 64 and the wall 84 of window 74 and in the lowering direction by interaction of the pawl 64 and the wall 80.

When the window 12 is resting on the window mounting surface 68, the strap 42 neither supports nor opposes any significant load on the operating elements of the adjustable spacer 28. However, in the unloaded position which is particularly noticed prior to adjustment at top surfaces of the window 12, the shape of the strap may be chosen to impose a load tending to urge the teeth 56, 72 together to maintain position for adjustment.

While only one preferred embodiment is herein described, others may be possible without departing from the scope of the appended claims.

I claim:

1. An adjustable spacer for positioning a window in an automotive vehicle body comprising:

a mounting member secured to the body;

an adjusting member engageable in wedging fashion with the mounting member, received in snap-fit relationship in the mounting member upon insertion therein in a direction normal to the wedging movement and having a flat surface slidingly abuttingly engaging a peripheral edge of the window whereby relative linear movement parallel to the window peripheral edge between the mounting member and the adjusting member in a wedging direction varies the position of the window with respect to the body; and a strap member flexibly interconnecting the mounting member and the adjusting member.

2. An adjustable spacer for positioning a window in an automotive vehicle body comprising:

a mounting member secured to the body;

an adjusting member engageable in wedging fashion with the mounting member, received in snap-fit relationship in the mounting member upon insertion therein in a direction normal to the wedging movement and having a flat surface slidingly abuttingly engaging a peripheral edge of the window whereby relative linear movement parallel to the window peripheral edge between the mounting member and the adjusting member in a wedging direction varies the position of the window with respect to the body; and a strap member flexibly interconnecting the mounting member and the adjusting member, the mounting member, the adjusting member and the strap members being integrally molded as a unitary part.

3. An adjustable spacer for positioning a window in an automotive vehicle body comprising:

a mounting member secured to the body and having a channel formed therein including diagonally extending surfaces formed in the base of the channel;

an adjusting member having a mating diagonal surface engageable in wedging fashion with the mounting member channel, received in snap-fit relationship in the mounting member upon insertion therein in a direction normal to the wedging movement and having a flat surface slidingly abuttingly engaging a peripheral edge of the window whereby relative linear movement parallel to the window peripheral edge between the mounting member and the adjusting member in a wedging direction varies the position of the window with respect to the body; and a strap member flexibly interconnecting the mounting member and the adjusting member.

4. An adjustable spacer for positioning a window in an automotive vehicle body comprising:

a mounting member secured to the body;

an adjusting member engageable in wedging fashion with the mounting member and having a flat surface slidingly abuttingly engaging a peripheral edge of the window whereby relative linear movement parallel to the window peripheral edge between the mounting member and the adjusting member in a wedging direction varies the position of the window with respect to the body;

a strap member flexibly interconnecting the mounting member and the adjusting member;

means defining a first set of diagonally extending ratchet teeth on the mounting member;

means defining a second set of mounting teeth on the adjusting member complementary to the first set operative to lock the adjusting member with respect to the mounting member at a plurality of positions of relative wedging movement;

wherein the first set of ratchet teeth is formed in a channel formed in the mounting member and receives therein the portion of the adjusting member on which the second set is formed, the channel having snap-fit retention means operatively disposed therein engageable with portions of the adjusting member.

* * * * *